US008631056B2

(12) United States Patent
Krithivasan et al.

(10) Patent No.: US 8,631,056 B2
(45) Date of Patent: Jan. 14, 2014

(54) PROCESSOR AND METHOD OF DETERMINING A NORMALIZATION COUNT

(75) Inventors: Shankar Krithivasan, Austin, TX (US); Erich James Plondke, Austin, TX (US); Lucian Codrescu, Austin, TX (US); Mao Zeng, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1739 days.

(21) Appl. No.: 11/971,230

(22) Filed: Jan. 9, 2008

(65) Prior Publication Data
US 2009/0177724 A1  Jul. 9, 2009

(51) Int. Cl.
*G06F 7/00* (2006.01)

(52) U.S. Cl.
USPC .......................................... 708/205

(58) Field of Classification Search
None
See application file for complete search history.

(56) References Cited

U.S. PATENT DOCUMENTS

| 4,890,251 | A | * | 12/1989 | Nitta et al. | 708/209 |
| 5,216,628 | A | | 6/1993 | Mizutani et al. | |
| 5,241,490 | A | * | 8/1993 | Poon | 708/205 |
| 5,844,826 | A | * | 12/1998 | Nguyen | 708/211 |
| 6,260,054 | B1 | | 7/2001 | Rosman et al. | |
| 6,795,839 | B2 | | 9/2004 | Karim et al. | |
| 7,062,525 | B1 | | 6/2006 | Lin | |
| 7,392,273 | B2 | | 6/2008 | Gerwig et al. | |
| 7,461,117 | B2 | | 12/2008 | Trong et al. | |
| 2006/0277235 | A1 | * | 12/2006 | Jeong et al. | 708/209 |

FOREIGN PATENT DOCUMENTS

| JP | 1185726 A | 7/1989 |
| JP | 4080815 A | 3/1992 |
| JP | 6236252 A | 8/1994 |
| JP | 7319671 A | 12/1995 |
| JP | 2003216410 A | 7/2003 |

OTHER PUBLICATIONS

International Search Report—PCT/US09/030537, International Search Authority—European Patent Office—Jun. 29, 2009.
Written Opinion—PCT/US09/030537, International Search Authority—European Patent Office—Jun. 29, 2009.

* cited by examiner

*Primary Examiner* — Michael D Yaary
(74) *Attorney, Agent, or Firm* — Peter Michael Kamarchik; Nicholas J. Pauley; Joseph Agusta

(57) ABSTRACT

In a particular embodiment, a method is disclosed that includes receiving an operand to be normalized at a normalization logic circuit, where the operand includes a plurality of bits. The method further includes generating a zero output when a value of the operand is equal to zero and, when the value is not equal to zero, generating an output value representing a number that is one less than a count of leading bits of the operand.

27 Claims, 7 Drawing Sheets

PROCESSOR AND METHOD OF DETERMINING A NORMALIZATION COUNT

I. FIELD

The present disclosure is generally related to a processor and method of determining a normalization count.

II. DESCRIPTION OF RELATED ART

In computer applications, numeric calculations may result in numbers that extend over a wide range of values. Within a processor that operates on binary numbers, normalization may be used to scale values to encompass the wide range of values. For example, in statistical calculations, it may be desirable to scale a range of values (e.g., zero to ½) to a second range of values (e.g., zero to one).

In general, a normalization process or instruction may be used for automatic gain control to scale or adjust an input or output signal. For example, in wireless telephone, a normalization instruction may be used to adjust a volume of a speaker output or a volume associated with a microphone input. In another particular example, a normalization operation may be used to estimate mathematical function, such as a logarithm function. In a particular example, the normalization instruction counts a number of consecutive leading bits of a signed value. If that number of consecutive leading bits is used to normalize a value by shifting the value to the left by the counted number of consecutive leading bits, the sign bit associated with the value may be lost. Accordingly, the resulting shifted number may be wrong.

III. SUMMARY

In a particular embodiment, a method is disclosed that includes receiving an operand to be normalized, where the operand includes a plurality of bits. The method further includes generating a zero output when a value of the operand is equal to zero and, when the value is not equal to zero, generating an output value representing a count of leading bits of the operand minus one.

In another particular embodiment, a processor is disclosed that includes an instruction execution unit configured to execute a normalization instruction. The instruction execution unit includes an input to receive an operand comprising a plurality of bits and a shifter circuit coupled to the input to shift the plurality of bits left by one bit to produce a plurality of shifted bits. The instruction execution unit further includes a leading bit counting circuit to receive the plurality of shifted bits and to count a number of leading bits of the plurality of shifted bits. The leading bit counting circuit provides a count representing the number of leading bits minus one to an output.

In still another particular embodiment, an instruction is executable by a processor to normalize an input value. The instruction includes a first instruction that is executable by an execution unit to determine a value of an input. The instruction includes a second instruction that is executable by the execution unit to produce a zero output when the determined value at the input is zero. The instruction also includes a third instruction that is executable by the execution unit to generate a normalization amount representing a count of a leading number of bits minus one when the determined value is non-zero.

In yet another particular embodiment, a method is disclosed that includes receiving an operand including a plurality of bits, shifting the plurality of bits left by one bit to generate a shifted plurality of bits, and inserting a zero value at a least significant bit of the shifted plurality of bits. The method further includes counting a leading number of bits in the shifted plurality of bits and outputting a count representing the leading number of bits minus one when the received plurality of bits has a non-zero value.

In another particular embodiment, a processor is disclosed that includes means for receiving an operand including a plurality of bits and includes means for generating a zero output when a value of the operand is equal to zero. The processor further includes means for generating an output value representing a count of leading bits of the operand minus one, when the value of the operand is not equal to zero.

One particular advantage provided by the embodiments of the circuit device and the methods described is that when a zero value is received (i.e., when all of the bits of at input are equal to zero), a zero value is provided at the output without shifting the bits. In this instance, the count value may be output quickly and with reduced power consumption.

Another particular advantage is provided in that false data is removed by masking selected bits at the output to provide a correct value.

Yet another particular advantage is provided in that leading bits may be counted, allowing the processor to count either leading ones or leading zeros using the same circuitry.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
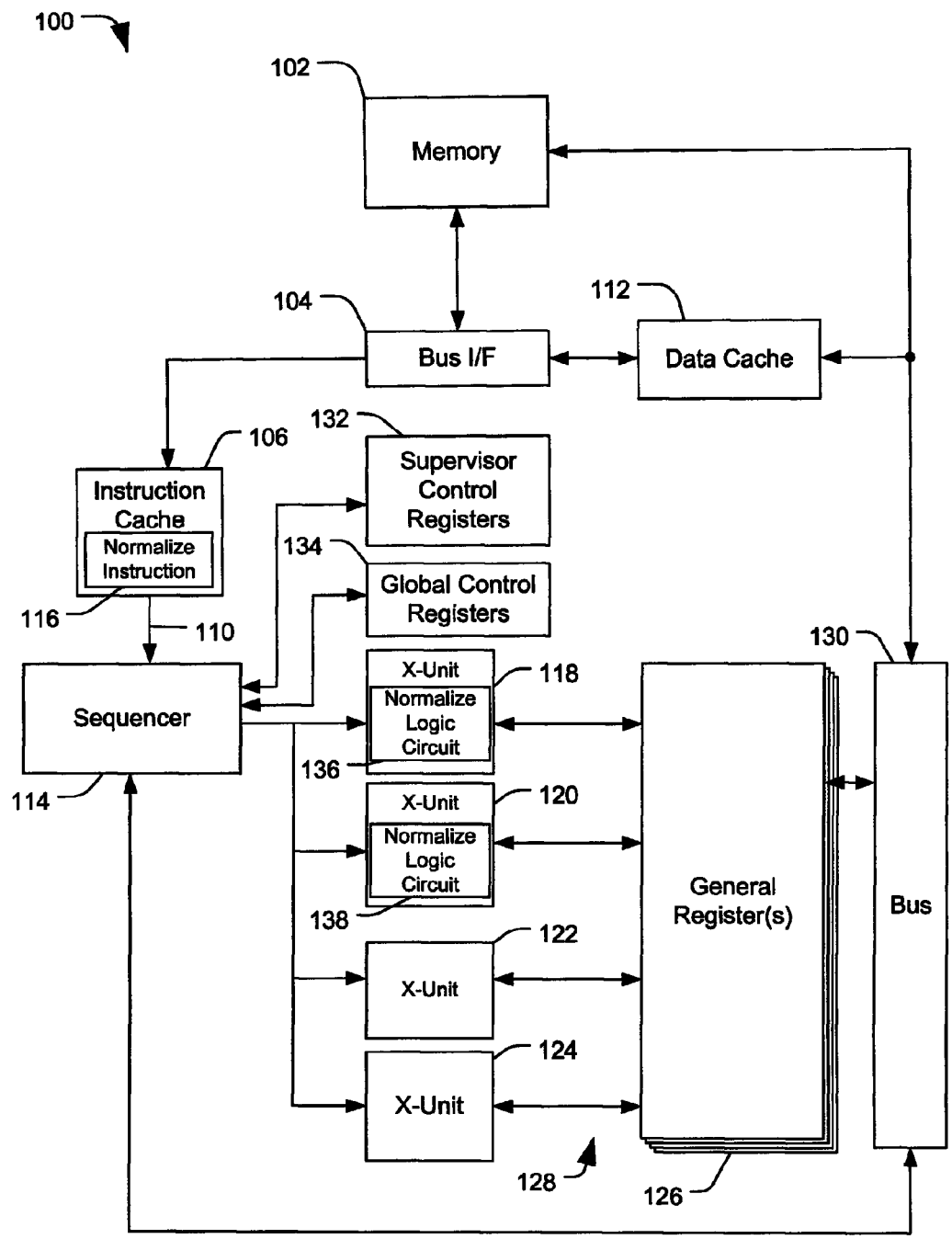
FIG. 1 is a block diagram of a particular illustrative embodiment of a system including an execution unit with normalization logic circuitry configured to determine a normalization amount.

FIG. 1 is a block diagram of a particular illustrative embodiment of a processing system 100 including an execution unit with normalization logic circuitry configured to determine a normalization amount. The processing system 100 includes a memory 102 that is configured to communicate with an instruction cache 106 and a data cache 112 via a bus interface 104. The instruction cache 106 is coupled to a sequencer 114 by a bus 110. The instruction cache 106 may store a normalize instruction 116, which may be provided to the sequencer 114 via the bus 110. The processing system 100 may also include supervisor control registers 132 and global control registers 134 to store bits that may be accessed by control logic within the sequencer 114 to determine whether to accept interrupts and to control execution of instructions.

In a particular embodiment, the instruction cache 106 is coupled to the sequencer 114 via a plurality of current instruction registers, which may be coupled to the bus 110 and associated with particular threads of the processing system 100. In a particular embodiment, the processing system 100 is an interleaved multi-threaded processor including six threads.

The sequencer 114 is coupled to a first instruction execution unit 118, a second instruction execution unit 120, a third instruction execution unit 122, and a fourth instruction execution unit 124. Each instruction execution unit 118, 120, 122, and 124 can be coupled to a general register file 126 via a second bus 128. The general register file 126 can also be coupled to the sequencer 114, the data cache 112, and the memory 102 via a third bus 130.

The first execution unit 118 includes a normalization logic circuit 136, and the second execution unit 120 includes a normalization logic circuit 138. In a particular embodiment, each of the execution units 118, 120, 122 and 124 may include a normalization logic circuit. In the embodiment shown, the execution units 118 and 120 are configured to utilize normalization logic circuits 136 and 138 to provide a normalization count related to a plurality of bits.

In a particular illustrative embodiment, the sequencer 114 provides the normalize instruction 116 to the first execution unit 118. In response to receiving the normalize instruction 116, the first execution unit 118 retrieves an operand and uses the normalization logic circuit 136 to count a leading number of bits of the operand minus one (i.e., a count of a leading number of bits minus one). The normalization logic circuit 136 is configured to selectively output a zero value when all the bits of the operand are zeros and to selectively output a number representing a count of the leading number of bits minus one when any bit of the operand is non-zero. The count of the leading number of bits can identify the number of consecutive bits having the same value, starting with and including the most significant bit. The number may be used in executing another instruction to scale or otherwise adjust a data value of the operand. For example, if the operand represents a value in a range of zero to ½, the number may be used to scale to operand into a range of zero to one.

In a particular illustrative embodiment, the normalization logic circuits 136 and 138 may include leading ones counting circuits, leading zeros counting circuits, or any combination thereof (not shown). In a particular embodiment, the normalization logic circuits 136 and 138 may include leading zeros counting circuits (such as a leading zeros counter 220 illustrated in FIG. 2). In this instance, if the leading bits are ones, the normalization logic circuits 136 and 138 may include logic circuitry to complement the operand before counting the leading zeros. In another particular embodiment, the normalization logic circuits 136 and 138 may be configured to count leading ones and to count leading zeros and to select whichever count is greater. For two's complement numbers, a number of leading zeros is zero for negative numbers, and a number of leading ones is zero for positive numbers. Thus, a number of leading bits may be used to judge a sign, a magnitude, or both, of the operand.

In a particular embodiment, the normalization instruction 116 includes two conditions: 1) if the value of the input operand is zero, then output a zero; and 2) if the value of the input operand is non-zero, then output a count of leading bits of the operand minus one. An example of assembly code to implement the normalization instruction 116 is presented below in Table 1.

TABLE 1

Exemplary Normalization Instruction

```
if (Rs == 0) {
    Rd = 0;
} else {
    Rd=(max(count_leading_ones(Rs), count_leading_zeros(Rs)))−1);
};
```

In Table 1, if the value of a source register (Rs) is equal to zero, then the destination register (Rd) is set to zero. Otherwise, a count of leading ones and a count of leading zeros in the value at the source register are compared to determine which count is greater. In particular, either the count of leading ones or the count of leading zeros will equal zero, and the other count will be a positive number. The count that is a positive number is reduced by one and stored at the destination register.

In a particular embodiment, the normalize instruction illustrated in Table 1 includes a first operation that is adapted to determine a value of an input (i.e., if Rs==0). The normalize instruction also includes a second operation that is adapted to produce a zero output when the determined value at the input is zero (i.e., Rd=0). The normalize instruction further includes a third operation that is adapted to generate a normalization amount representing a count of a leading number of bits minus one when the determined value is non-zero (i.e., Rd=(max(count_leading_ones(Rs), count_leading_zeros (Rs)))−1)). In a particular example, the zero output or the count is generated in a single instruction cycle of a processor. In a particular example, a single instruction cycle can represent multiple stages of an execution thread, including a read register file stage, a decode stage, one or more execution stages, and a write back stage. In a particular embodiment, the normalization instruction can include additional operations, microinstructions, or any combination thereof. In another particular embodiment, the normalization instruction can spawn or otherwise initiate additional microinstructions or operations. In a particular example, the normalization instruction can initiate execution of a microinstruction that utilizes the normalization amount to shift a value left according to the normalization amount.

Figure 2:
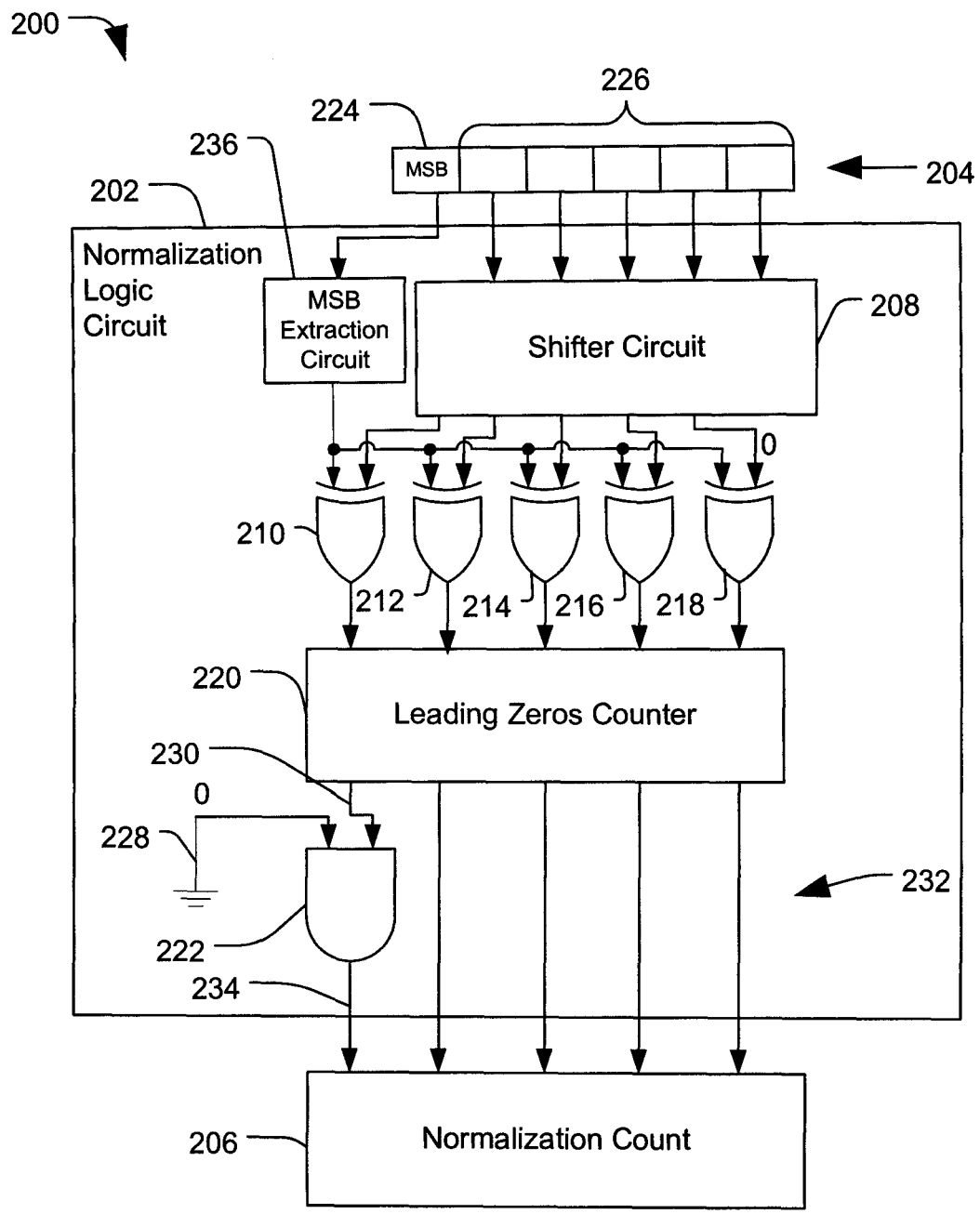
FIG. 2 is a diagram of a particular illustrative embodiment of a circuit device including normalization logic circuitry configured to determine a normalization count.

FIG. 2 is a diagram of a particular illustrative embodiment of a circuit device 200 including normalization logic circuit 202 configured to determine a normalization count. The normalization logic circuit 202 is configured to receive an input 204, such as an operand including a most significant bit 224 and multiple other bits 226. The normalization logic circuit 202 is configured to process the input 204 to produce a normalization count 206, which represents either a zero value when the value at the input 204 is zero or which represents a count of a leading number of bits of the input 204 minus one. The normalization logic circuit 202 includes a shifter circuit 208, which may be a bi-directional shifter circuit. In a particular example, the shifter circuit 208 is configured to shift received bits left by one bit and to insert a zero value in a least significant bit position to produce a plurality of shifted bits.

The normalization logic circuit 202 includes a most significant bit (MSB) extraction circuit 236 that is configured to extract the most significant bit 224 from the input 204. The normalization logic circuit 202 also includes multiple exclusive OR gates 210, 212, 214, 216, and 218. Each of the multiple exclusive OR gates 210, 212, 214, 216, and 218 includes a first input coupled to the MSB extraction circuit 236 to receive the most significant bit 224 and includes a second input coupled to the shifter circuit 208 to receive a respective bit of the plurality of shifted bits. In a particular example, if the most significant bit 224 has a value of one, each of the exclusive OR gates 210, 212, 214, 216, and 218 complements the respective bit of the plurality of shifted bits. If the most significant bit 224 has a value of zero, each of the exclusive OR gates 210, 212, 214, 216, and 218 passes the respective bit of the plurality of shifted bits.

The normalization logic circuit 202 includes a leading zeros counter 220 and a logical AND gate 222. The leading zeros counter 220 is coupled to an output of each of the exclusive OR gates 210, 212, 214, 216, and 218 to receive an operand representing either the plurality of shifted bits or a complemented version of the plurality of shifted bits. The leading zeros counter 220 counts a leading number of consecutive zeros in the operand and outputs a count representing a leading number of consecutive zeros via leads 230 and 232. The logical AND gate 222 masks a most significant bit of the count at the lead 230 by logically ANDing the value at the lead 230 with a zero value 228 (i.e., an electrical ground). The masked output 234 (i.e., zero value) and the values at the leads 232 are provided as the normalization count 206 at an output of the normalization logic circuit 202. In general, while the leading zeros counter 220 is adapted to count a leading number of consecutive zeros, other counters may be also be used, such as a leading ones counter to count a leading number of consecutive ones, a leading bit counter to count a leading number of consecutive bits, or any combination thereof.

In a particular example, the normalization logic circuit 202 may be within an execution unit of a processor, such as the execution unit 118 of the processor 100 illustrated in FIG. 1. In an embodiment, the normalization logic circuit 202 is configured to provide a normalization count 206, which is a count that represents a number of bits by which a particular operand is to be shifted to normalize the operand. When the input 204 is a non-zero value, the shift circuit 208 shifts the bits 226 left by one, eliminating a most significant bit. A zero value is inserted in a vacated position (i.e., at a least significant bit). This shift left and insert zero provides a count of leading bits minus one. In the case where the input is all zeros, the leading zeros counter 220 may count all zeros, for example, and provide a one in a most significant bit position. In a particular example, the one value in the most significant bit position may represent a shift value of 32. The only input value that has 32 consecutive values is an input of zero. Thus, the most significant bit at 230 is masked (i.e., reduced to zero) using the logical AND gate 222 to provide the desired zero result.

Figure 3:
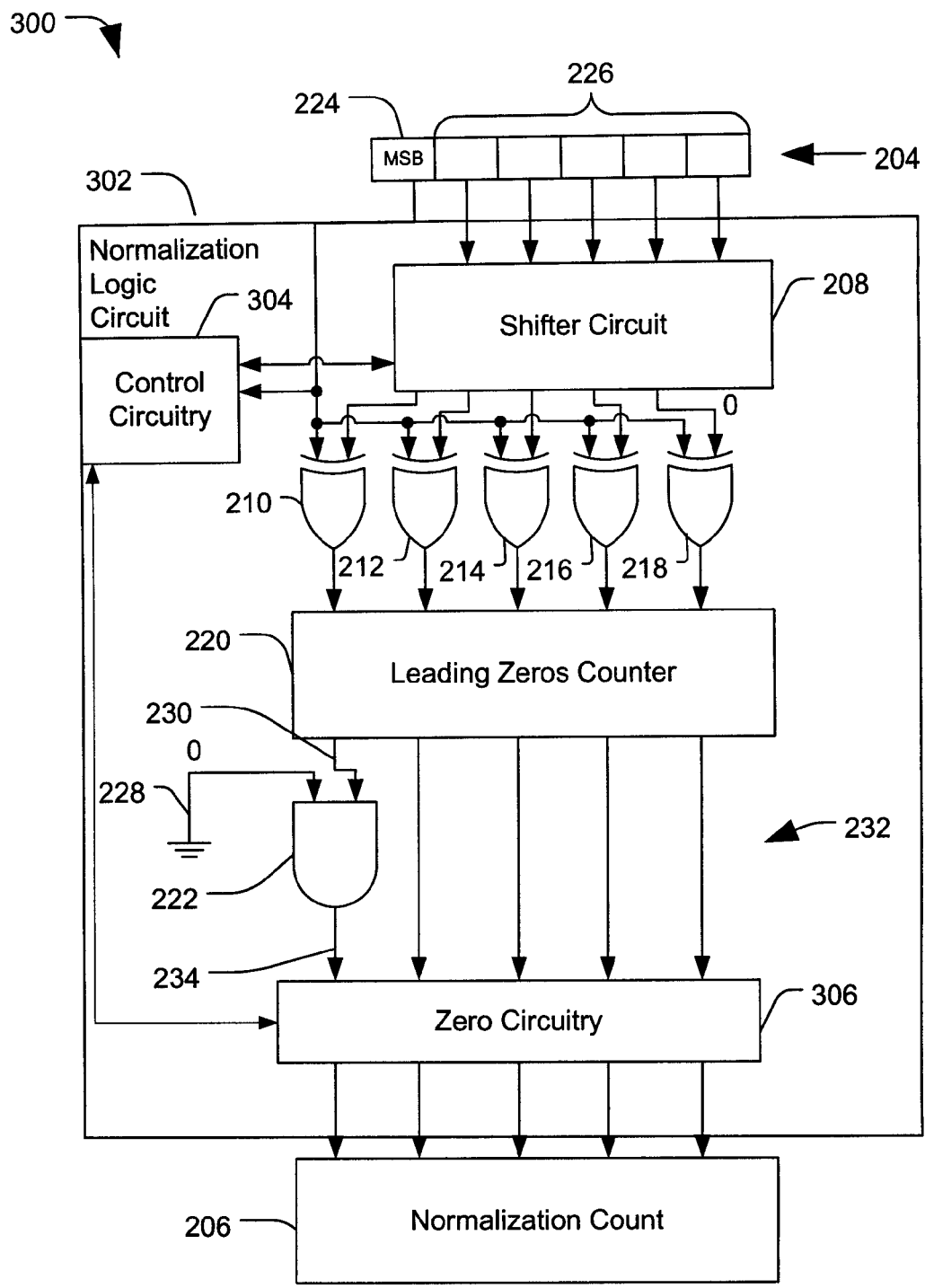
FIG. 3 is a diagram of a second particular illustrative embodiment of a circuit device including normalization logic circuitry configured to determine a normalization count.

FIG. 3 is a diagram of a second particular illustrative embodiment of a circuit device 300 including normalization logic circuit 302 configured to determine a normalization count. In this particular example, the normalization logic circuit 302 includes the same circuitry as the normalization logic circuit 202 in FIG. 2. However, the normalization logic circuit 302 includes control circuitry 304 that is coupled to the shifter circuit 208 and to the MSB 224 and is configured to detect an operand having a zero value. The normalization logic circuit 302 also includes a zero circuit 306 that is responsive to the control circuitry 304 to provide a zero value as the normalization count 206 at an output of the normalization logic circuit 302 when the value of the operand at the input 204 is zero. When the value is non-zero, the zero circuit 306 may operate as a pass gate to allow the output of the leading zeros counter 220 to be passed to the output as the normalization count 306. In this particular example, the control circuitry 304 may bypass the shifter circuit 208, the multiple exclusive OR gates 210, 212, 214, 216, and 218, and the leading zeros counter 220 to provide a zero at the output using the zero circuit 306.

Figure 4:
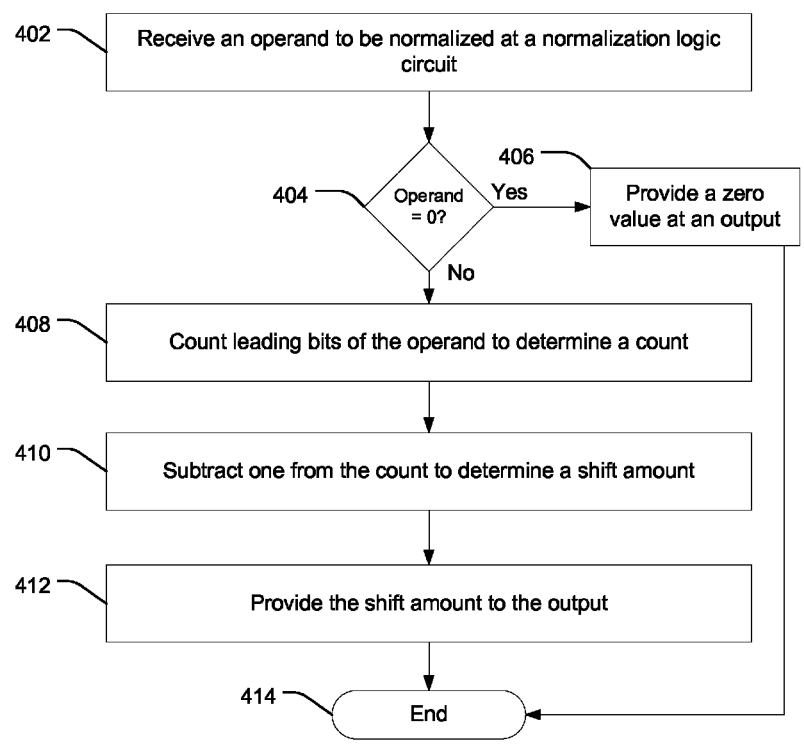
FIG. 4 is a flow diagram of a particular illustrative embodiment of a method of determining a normalization count.

FIG. 4 is a flow diagram of a particular illustrative embodiment of a method of determining a normalization count. At 402, an operand to be normalized is received at a normalization logic circuit. Advancing to 404, if a value of the operand is equal to zero, the method advances to 406 and a zero value is provided at an output. For example, when the operand is equal to zero, the zero value does not need to be scaled or normalized, so the shift amount of the operand should be zero. In a particular example, control circuitry may be provided within a normalization logic circuit to determine the value of the operand and to control an output to provide a zero value when the operand has a value of zero. Continuing to 414, the method terminates.

Returning to 404, if a value of the operand is not equal to zero, the method advances to 408, and leading bits of the operand are counted to determine a number. In a particular illustrative embodiment, the leading number of bits are counted using a leading zero counter circuit, which is configured to count leading zeros. In a particular example, if a most significant bit of the operand is equal to one, the most significant bit may be used to complement the other bits and the leading zero counter circuit may count the number of zero in a complemented version of the operand. Moving to 410, one is subtracted from the number to determine a shift amount. In a particular example, the one is subtracted by shifting the other bits left by one and inserting a zero in a least significant bit position. Continuing to 412, the shift amount is provided at an output. The shift amount represents a count of a number of leading bits minus one. The method terminates at 414.

In a particular example, receiving an operand to be normalized may occur after receiving a normalize instruction that is executable by an execution unit of a processor. The normalize instruction may include a source register address from which the operand may be retrieved. The normalize instruction is executable by the processor in a single execution cycle. In a particular example, counting leading bits of the operand to determine a number at 408 and subtracting one from the number to determine a shift amount may include extracting a most significant bit of the operand, shifting remaining bits of the operand left by one bit to produce a plurality of shifted bits, inserting a zero value in a least significant bit of the plurality of shifted bits, counting a leading number of zeros in the plurality of shifted bits to produce a shift amount, and masking a most significant bit of the shift amount to provide the shift amount at an output. In a particular example, masking the most significant bit of the shift amount may include providing the most significant bit to an input of a logical AND gate that includes a second input coupled to a logical zero value, such as an electrical ground.

Figure 5:
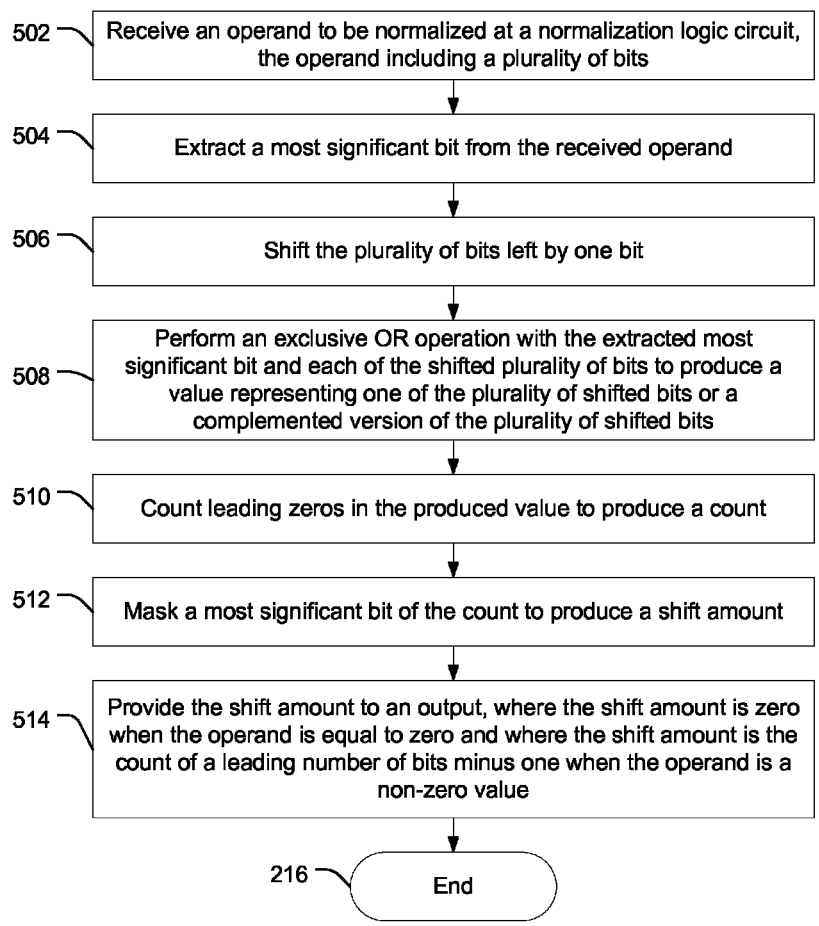
FIG. 5 is flow diagram of a second particular illustrative embodiment of a method of determining a normalization count.

FIG. 5 is a flow diagram of a second particular illustrative embodiment of a method of determining a normalization count. At 502, an operand to be normalized is received at a normalization logic circuit, which operand includes a plurality of bits. Advancing to 504, a most significant bit is extracted from the plurality of bits. Continuing to 506, the plurality of bits are shifted left by one bit. Moving to 508, an exclusive OR operation is performed with the extracted most significant bit and each of the shifted plurality of bits to produce a value representing one of the plurality of shifted bits or a complemented version of the plurality of shifted bits. Proceeding to 510, a leading number of zeros is counted in the produced value to produce a number. Moving to 512, a most significant bit of the number is masked to produce a shift amount. Continuing to 514, a shift amount is provided at an output, where the shift amount is zero when the operand is equal to zero and where the shift amount is the count of a leading number of bits minus one when the operand is a non-zero value. The method terminates at 516.

Figure 6:
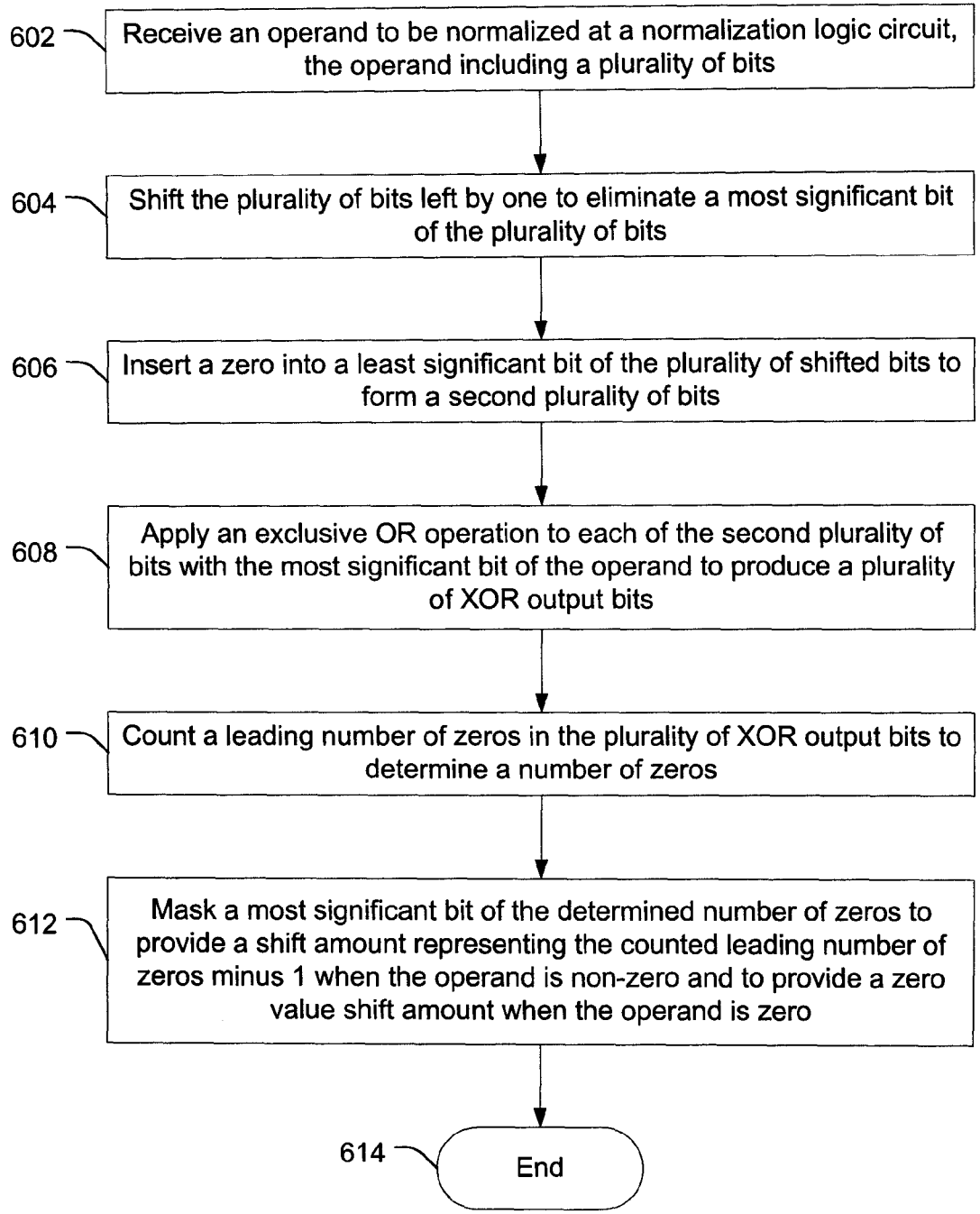
FIG. 6 is flow diagram of a third particular illustrative embodiment of a method of determining a normalization count.

FIG. 6 is flow diagram of a third particular illustrative embodiment of a method of determining a normalization count. At 602, the method includes receiving an operand to be normalized at a normalization logic circuit, where the operand includes a plurality of bits. Advancing to 604, the plurality of bits is shifted left by one to eliminate a most significant bit of the plurality of bits. Moving to 606, a zero value is inserted into a least significant bit position of the plurality of shifted bits to form a second plurality of bits. Continuing to 608, an exclusive OR operation is applied to each of the second plurality of bits using the most significant bit of the operand to produce a plurality of XOR output bits. Proceeding to 610, a leading number of zeros in the plurality of XOR output bits is counted to determine a number of zeros. Advancing to 612, a most significant bit of the determined number of zeros is masked to provide a shift amount representing the counted leading number of zeros minus 1 when the operand is non-zero and to provide a zero value when the operand is zero. The method terminates at 614.

Figure 7:
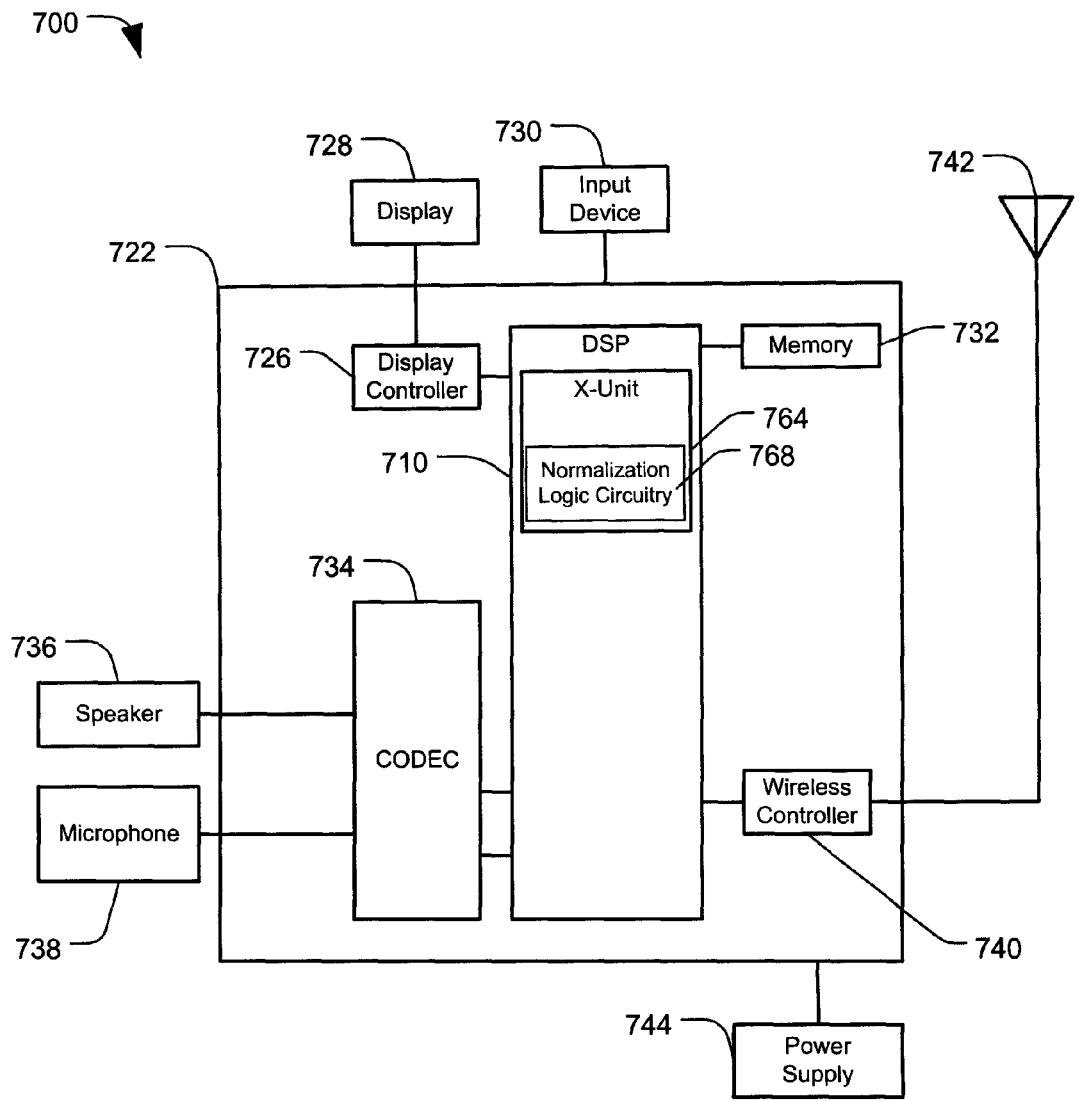
FIG. 7 is a block diagram of an illustrative embodiment of a wireless communication device including an execution unit having normalization circuitry configured to determine a normalization amount.

FIG. 7 is a block diagram of an illustrative embodiment of a wireless communication device 700 including an execution unit 764 having normalization logic circuitry 768 configured to determine a normalization amount. The normalization logic circuit 768 may be similar to the normalization logic circuits 136, 202, and 302 described with respect to FIGS. 1, 2, and 3, respectively. The wireless communications device 700 can include a digital signal processor (DSP) 710 that has an execution unit 764 with normalization logic circuitry 768. The normalization logic circuitry 768 is operable to determine a leading number of bits minus one at an input, as described with respect to FIGS. 1-6. The wireless communications device 700 also includes a memory 732 that is accessible to the DSP 710. In a particular embodiment, the normalization logic circuitry 768 may be utilized by the execution unit 764 to provide a normalization count relative to a plurality of data bits within a single instruction (execution) cycle of the execution unit 764.

FIG. 7 also shows a display controller 726 that is coupled to the digital signal processor 710 and to a display 728. A coder/decoder (CODEC) 734 can also be coupled to the digital signal processor 710. A speaker 736 and a microphone 738 can be coupled to the CODEC 734.

FIG. 7 also indicates that a wireless controller 740 can be coupled to the digital signal processor 710 and to a wireless antenna 742. In a particular embodiment, an input device 730 and a power supply 744 are coupled to the on-chip system 722. Moreover, in a particular embodiment, as illustrated in FIG. 7, the display 728, the input device 730, the speaker 736, the microphone 738, the wireless antenna 742, and the power supply 744 are external to the on-chip system 722. However, each is coupled to a component of the on-chip system 722.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   receiving an operand at a normalization logic circuit, the operand including a plurality of bits; and
   generating a first shift amount having a value representing a number that is one less than a count of leading bits of the operand when a value of the operand is not equal to zero, wherein generating the first shift amount comprises:
   extracting a most significant bit from the plurality of bits;
   shifting remaining bits of the plurality of bits left by one bit to produce a plurality of shifted bits;
   inserting a zero value in a least significant bit of the plurality of shifted bits;
   counting a leading number of zeros in the plurality of shifted bits to produce a gross shift amount; and
   masking a most significant bit of the gross shift amount.

2. The method of claim 1, further comprising receiving a normalization instruction that is executable by an execution unit of a processor.

3. The method of claim 2, wherein the operand is received after receiving the normalization instruction.

4. The method of claim 1, further comprising:
   generating a second shift amount having a zero value when the value of the operand is equal to zero.

5. The method of claim 1, wherein masking the most significant bit of the gross shift amount comprises providing the most significant bit to an input of a logical AND gate that includes a second input coupled to a logical zero value.

6. The method of claim 4, further comprising providing the first shift amount or the second shift amount to an output of the normalization logic circuit.

7. The method of claim 4, wherein generating the second shift amount comprises:

determining that the received operand has a value of zero; and generating a logic signal to provide the second shift amount to the output of the normalization circuit.

8. A processor comprising:

an instruction execution unit configured to execute a normalization instruction, the instruction execution unit comprising:
- an input adapted to receive an operand comprising a plurality of bits;
- a most significant bit extraction circuit coupled to the input and adapted to extract a most significant bit from the plurality of bits;
- a shifter circuit coupled to the input, the shifter circuit adapted to:
  - shift remaining bits of the plurality of bits left by one bit to produce a plurality of shifted bits; and
  - insert a zero value in a least significant bit of the plurality of shifted bits;
- a leading bit counting circuit adapted to count a leading number of zeros in the plurality of shifted bits to produce a gross shift amount; and
- a mask circuit adapted to mask a most significant bit of the gross shift amount.

9. The processor of claim 8, wherein the mask circuit includes a logical AND gate.

10. The processor of claim 8, wherein the leading bit counting circuit comprises a leading zero counting circuit coupled to outputs of a plurality of exclusive OR gates, and wherein each exclusive OR gate of the plurality of exclusive OR gates is adapted to receive the most significant bit and a particular bit of the plurality of shifted bits.

11. The processor of claim 8, wherein the gross shift amount corresponds to a count representing a number of leading bits of the plurality of bits minus one.

12. The processor of claim 8, further comprising a control circuit configured to determine when the operand has a value of zero.

13. The processor of claim 8, wherein the shifter circuit comprises a bi-directional shifter circuit.

14. A non-transitory computer readable medium storing a normalization instruction that, when executed by an execution unit of a processor, causes the execution unit to:
- receive an operand including a plurality of bits;
- extract a most significant bit from the plurality of bits;
- shift remaining bits of the plurality of bits left by one bit to produce a plurality of shifted bits;
- insert a zero value in a least significant bit of the plurality of shifted bits;
- count a leading number of zeros in the plurality of shifted bits to produce a gross shift amount; and
- mask a most significant bit of the gross shift amount.

15. The non-transitory computer readable medium of claim 14, wherein the normalization instruction is executed in a single instruction cycle of the processor.

16. The non-transitory computer readable medium of claim 14, wherein the execution unit comprises normalization logic circuitry adapted to execute the normalization instruction.

17. The non-transitory computer readable medium of claim 14, wherein a value of the operand is not equal to zero.

18. A method comprising:
- receiving an operand including a plurality of bits at a normalization logic circuit;
- shifting, at a shifter circuit that is coupled to the normalization logic circuit, the plurality of bits left by one bit to generate a shifted plurality of bits;
- inserting, at the shifter circuit, a zero value at a least significant bit of the shifted plurality of bits;
- counting, at a leading bit counting circuit that is coupled to the normalization logic circuit, a leading number of bits in the shifted plurality of bits; and
- outputting, from the normalization logic circuit, a count representing the leading number of bits minus one when the received plurality of bits has a non-zero value.

19. The method of claim 18, wherein counting the leading number of bits comprises:
- extracting the most significant bit of the received plurality of bits;
- complementing the shifted plurality of bits to produce a complemented plurality of bits when a most significant bit of the received plurality of bits has a one value; and
- counting a leading number of zeros in the complemented plurality of bits.

20. The method of claim 18, wherein counting the leading number of bits comprises counting a leading number of zeros in the shifted plurality of bits.

21. The method of claim 18, further comprising providing a zero value at an output when the received operand represents a zero value.

22. A processor comprising:
- means for receiving an operand including a plurality of bits; and
- means for generating an output value representing a number that is one less than a count of leading bits of the operand when a value of the operand is not equal to zero, wherein the means for generating comprises:
  - means for extracting a most significant bit from the plurality of bits;
  - means for shifting remaining bits of the operand left by one bit to produce a plurality of shifted bits;
  - means for inserting a zero value in a least significant bit of the plurality of shifted bits;
  - means for counting a leading number of zeros in the plurality of shifted bits to produce a shift amount; and
  - means for masking a most significant bit of the shift amount.

23. The processor of claim 22, further comprising means for generating a zero output when the value of the operand is equal to zero.

24. The processor of claim 23, wherein the means for generating the zero output comprises:
- means for determining a value of the received operand; and
- means for generating a logic signal to provide a zero value to an output of an execution unit when the value of the operand is equal to zero.

25. The processor of claim 22, further comprising means for receiving a normalization instruction that is executable by an execution unit in a single execution cycle.

26. A non-transitory computer readable medium storing processor executable instructions that, when executed by an execution unit of a processor, causes the execution unit to:
- receive an operand at a normalization logic circuit, the operand including a plurality of bits; and
- generate, at a leading zeros counting circuit that is coupled to the normalization logic circuit, a first shift amount having a value representing a number that is one less than a count of leading bits of the operand when a value of the operand is not equal to zero, wherein generating the first shift amount comprises:
  - extracting a most significant bit from the plurality of bits;
  - shifting remaining bits of the plurality of bits left by one bit to produce a plurality of shifted bits;

inserting a zero value in a least significant bit of the plurality of shifted bits;

counting a leading number of zeros in the plurality of shifted bits to produce a gross shift amount; and masking a most significant bit of the gross shift amount.

27. The non-transitory computer readable medium of claim 26, further comprising processor executable instructions that, when executed by the execution unit, cause the execution unit to generate a second shift amount having a zero value when the value of the operand is equal to zero.

* * * * *